United States Patent
Martin

(10) Patent No.: US 10,142,157 B2
(45) Date of Patent: Nov. 27, 2018

(54) METHOD AND SYSTEM FOR REDUCING TRANSMISSION OF REDUNDANT DATA

(75) Inventor: Daryl Joseph Martin, Kitchener (CA)

(73) Assignee: BLACKBERRY LIMITED, Waterloo (CA)

( * ) Notice: Subject to any disclaimer, the term of this patent is extended or adjusted under 35 U.S.C. 154(b) by 1781 days.

(21) Appl. No.: 12/797,659

(22) Filed: Jun. 10, 2010

(65) Prior Publication Data

US 2011/0307540 A1 Dec. 15, 2011

(51) Int. Cl.
*H04L 29/08* (2006.01)
*H04L 29/06* (2006.01)

(52) U.S. Cl.
CPC ........ *H04L 29/08792* (2013.01); *H04L 67/04* (2013.01); *H04L 69/22* (2013.01)

(58) Field of Classification Search
CPC .... H04L 67/02; H04L 67/2842; H04W 80/00; H04N 21/231
USPC .......................................... 709/202, 242, 247
See application file for complete search history.

(56) References Cited

U.S. PATENT DOCUMENTS

| | | | |
|---|---|---|---|
| 5,754,774 A | 5/1998 | Bittinger et al. | |
| 5,768,515 A | 6/1998 | Choquier et al. | |
| 5,859,971 A | 1/1999 | Bittinger et al. | |
| 5,878,213 A | 3/1999 | Bittinger et al. | |
| 6,032,197 A | 2/2000 | Birdwell et al. | |
| 6,061,714 A * | 5/2000 | Housel et al. | 709/203 |
| 6,073,173 A | 6/2000 | Bittinger et al. | |
| 6,260,066 B1 | 7/2001 | Bittinger et al. | |
| 6,480,887 B1 * | 11/2002 | Hayama | 709/217 |
| 6,954,801 B1 * | 10/2005 | Housel | 709/247 |
| 7,076,560 B1 * | 7/2006 | Lango et al. | 709/231 |
| 7,548,984 B2 * | 6/2009 | Kurauchi | 709/231 |
| 7,720,936 B2 * | 5/2010 | Plamondon | 709/219 |
| 8,831,002 B2 * | 9/2014 | Haserodt | H04L 69/04 370/392 |
| 2002/0150050 A1 * | 10/2002 | Nathanson | 370/241 |
| 2003/0120813 A1 * | 6/2003 | Majumdar | H04L 29/06 709/247 |
| 2004/0068579 A1 * | 4/2004 | Marmigere et al. | 709/242 |

(Continued)

FOREIGN PATENT DOCUMENTS

WO 2005032101 4/2005

OTHER PUBLICATIONS

European Search Report dated Nov. 23, 2010 for corresponding European Patent Application No. 10165490.3.

(Continued)

*Primary Examiner* — Joshua Joo
(74) *Attorney, Agent, or Firm* — Ridout & Maybee LLP

(57) ABSTRACT

A method and system for reducing protocol headers sent over a wireless network are described. The method includes receiving at a proxy server, from a mobile device, a protocol request device addressed to a remote system. The protocol request including defined headers and an enable-caching indicator. The proxy server stores at least one of the defined headers as cached headers and sends a protocol response to the mobile device identifying the cached headers. Subsequent requests from the mobile device are formatted as abridged requests that exclude the cached headers, thereby reducing the data transmitted. The proxy server adds the cached headers to the abridged requests before forwarding them as unabridged requests to the remote system.

7 Claims, 4 Drawing Sheets

(56) References Cited

U.S. PATENT DOCUMENTS

| | | | |
|---|---|---|---|
| 2004/0073604 A1* | 4/2004 | Moriya et al. | 709/202 |
| 2005/0015550 A1* | 1/2005 | Challenger | G06F 17/30902 |
| | | | 711/118 |
| 2005/0055464 A1 | 3/2005 | Weller | |
| 2005/0246515 A1* | 11/2005 | Betzinger et al. | 712/24 |
| 2006/0168262 A1* | 7/2006 | Frazer | 709/230 |
| 2006/0259637 A1* | 11/2006 | Yadav et al. | 709/231 |
| 2007/0173277 A1* | 7/2007 | Yun | 455/522 |
| 2009/0013078 A1* | 1/2009 | Bencheikh | H04L 65/80 |
| | | | 709/227 |
| 2009/0083217 A1* | 3/2009 | Levow | 707/2 |
| 2009/0204682 A1* | 8/2009 | Jeyaseelan | H04L 67/02 |
| | | | 709/217 |
| 2009/0271526 A1* | 10/2009 | Watanabe et al. | 709/236 |
| 2009/0319630 A1* | 12/2009 | Weller | H04L 69/04 |
| | | | 709/206 |
| 2010/0050256 A1* | 2/2010 | Knapp et al. | 726/22 |
| 2010/0063998 A1* | 3/2010 | Nakamura | 709/203 |
| 2010/0088398 A1* | 4/2010 | Plamondon | 709/220 |
| 2011/0066703 A1* | 3/2011 | Kaplan et al. | 709/219 |
| 2011/0153722 A1* | 6/2011 | Choudhary et al. | 709/203 |
| 2011/0219127 A1* | 9/2011 | Fu | 709/228 |

OTHER PUBLICATIONS

Wireless Application Protocol—Wireless Session Protocol Specification, Approved Version Jul. 5, 2001.
Ma, Cathy—Canadian Intellectual Property Office, "Examiner's Requisition" for Canadian Patent Application No. 2,743,070 dated Dec. 12, 2013.
Canadian Office action dated Feb. 5, 2013 for corresponding Canadian Patent Application No. 2,743,070.

\* cited by examiner

METHOD AND SYSTEM FOR REDUCING TRANSMISSION OF REDUNDANT DATA

TECHNICAL FIELD

The present disclosure relates to the reduction of redundant data transmission over a wireless network, and more specifically to the reduction in the transmission of redundant protocol headers.

BACKGROUND

In many applications where information is stored on a remote server, a client application often sends multiple requests to retrieve this information. Depending on the communication protocol used by the application, these requests can contain large amounts of identical and therefore redundant information.

On an internet browser, a typical HyperText Markup Language (HTML) page contains numerous items each of which trigger separate HyperText Transfer Protocol (HTTP) requests. The format of each HTTP request includes a number of headers which contain fields containing header information or values that the client application supplies to the remote server to enable the remote server to send a suitable response. For example, headers may include fields specifying the client application's browser type, the default character set to be used, the image types recognized by the client application, and the image settings like a display height and width.

It would be advantageous to provide a system and method for reducing the transmission of redundant data.

BRIEF DESCRIPTION OF THE DRAWINGS

Embodiments will now be described, by way of example only, with reference to the attached Figures, wherein.

Like reference numerals are used throughout the Figures to denote similar elements and features.

DETAILED DESCRIPTION OF EXAMPLE EMBODIMENTS

Figure 1:
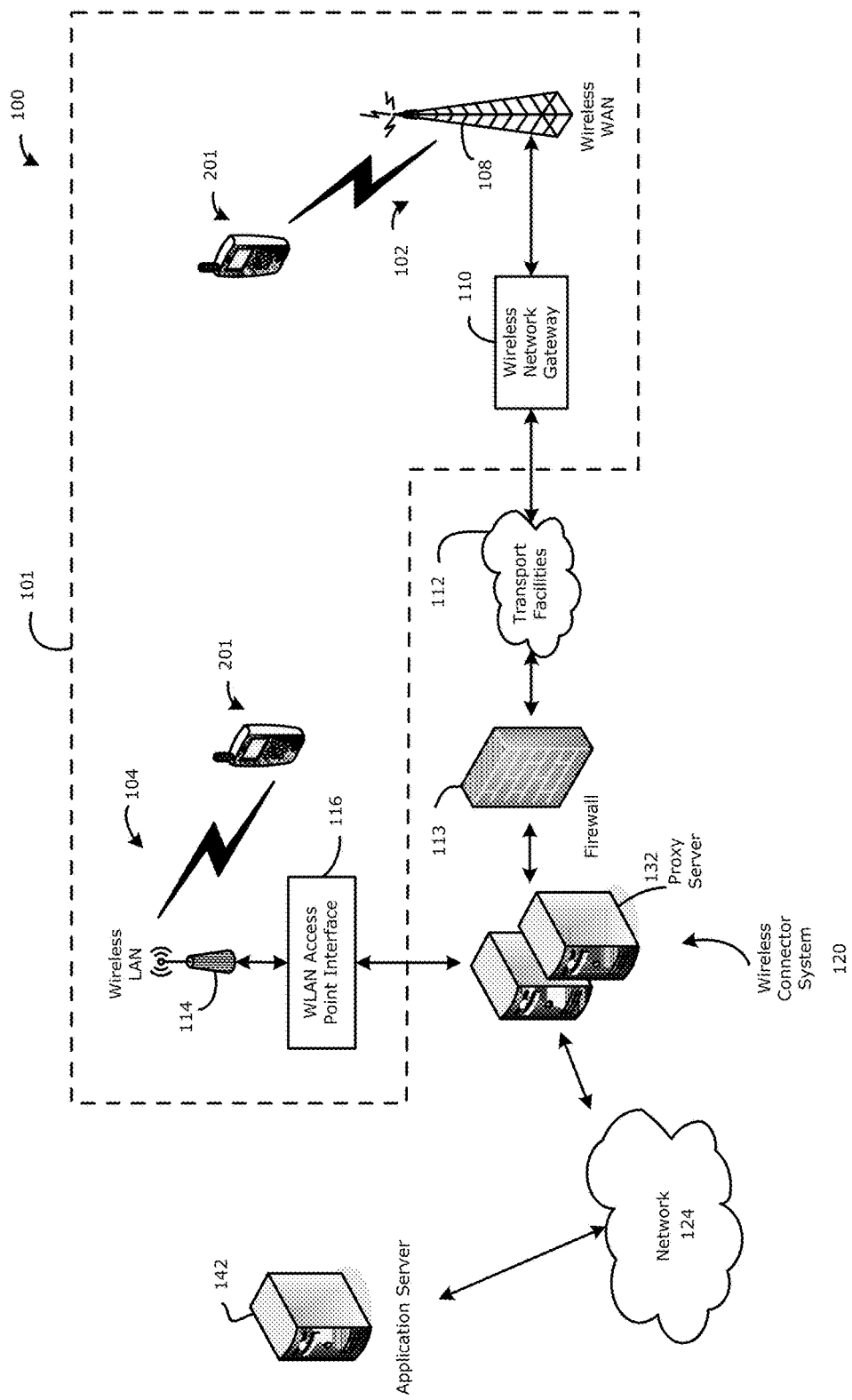
FIG. 1 is a block diagram of a communications system to which embodiments may be applied.

In accordance with one aspect of the present disclosure, there is provided a method for reducing data transmitted between a communications device and a server, the communications device being configured to transmit requests for content from a remote system to the server, wherein the requests conform to a protocol. The method includes receiving at the server a protocol request from the communications device, the protocol request including a plurality of defined headers and an enable-caching indicator; storing at least one of the defined headers on the server as cached headers; and sending a protocol response from the server to the communications device, the protocol response identifying the cached headers stored on the server.

In accordance with another aspect of the present disclosure, there is provided a method for reducing data transmitted between a communications device and a server, the communications device being configured to transmit requests for content from a remote system to the server, wherein the requests conform to a protocol. The method includes transmitting from a communications device to a server a protocol request, the protocol request including a plurality of defined headers and an enable-caching indicator; receiving a protocol response from the server, the protocol response identifying at least one of the defined headers as cached headers stored on the server; and sending a subsequent protocol request to the server as an abridged request excluding the defined headers identified as cached headers.

In another aspect, the present application discloses a server for reducing data transmitted in communications with a communications device, the communications device being configured to transmit requests for content from a remote system to the server, wherein the requests conform to a protocol. The server includes a processor; memory; and a communications module which, when executed by the processor, configures the processor to receive a protocol request from the communications device, the protocol request including a plurality of defined headers and an enable-caching indicator, store in the memory at least one of the defined headers on the server as cached headers, and send a protocol response to the communications device, the protocol response identifying the cached headers stored in the memory.

In yet another aspect, the present application describes a communication device configured to reduce data transmitted between the communications device and a server. The communication device includes a processor; a memory; a communication subsystem for sending and receiving communications with the server; and a protocol communication module which when executed configures the processor to send requests for content from a remote system to the server, wherein the requests conform to a protocol. The module further configures the processor to transmit to the server a protocol request, the protocol request including a plurality of defined headers and an enable-caching indicator, receive a protocol response from the server, the protocol response identifying at least one of the defined headers as cached headers stored on the server, and send a subsequent protocol request to the server as an abridged request excluding the defined headers identified as cached headers.

In a further aspect, the present application provides a method for reducing data transmitted between a server and a communications device, the server being configured to transmit responses for content from the server to the communications device, wherein the responses conform to a protocol. The method includes receiving at the communications device a protocol response from the server, the protocol response including a plurality of defined headers and an enable-response-caching indicator; storing at least one of the defined headers on the communications device as cached headers; and sending a protocol request from the communications device to the server, the protocol request identifying the cached headers stored on the communications device.

Mobile device applications, such as Internet browsers, often communicate with remote servers to access data in the form of content or instructions. To access the data on the remote server, the application may send a number of requests over the Internet to the remote server. Generally, these applications send requests to application servers using standard communication protocols. For example, an Internet browser on a mobile device will often communicate using HyperText Transfer Protocol (HTTP) or Wireless Application Protocol (WAP).

A mobile web browser using HTTP can generate numerous HTTP requests to load a single webpage. Each HTTP request includes a request line and a number of headers which contain information that the remote server may use to respond appropriately to the request. Each header has two parts: a header field, and a header value separated by a single colon. Below is an non-limiting example of an HTTP header request:

GET/path/index.html HTTP/1.1
Accept: text/plain, text/html
Accept-Charset: ISO-8859-1, US-ASCII
Accept-Language: EN
Host: www.example.com
Content-Encoding: gzip
User-Agent: Mozilla/4.0 (compatible; MSIE 6.0; Windows NT 5.1)

Header information is generally stored in strings of American Standard Code for Information Interchange (ASCII) characters which can be significant in size and may make up a large portion of an HTTP request. In many cases, the headers do not change during a communication session, i.e. the header values are static. For example, header fields such as the image types supported by the application, the character sets supported by the application, and other such fields, are unlikely to have values that change during the course of a communication session. Accordingly, re-sending these headers with every request may be unnecessary.

While the examples described herein discuss HTTP headers, the present disclosure may apply to any protocol using text or binary headers including but not limited to Session Initiation Protocol (SIP), Real-time Transport Protocol (RTP), File Transfer Protocol (FTP), Simple Mail Transfer Protocol (SMTP), and Simple Object Access Protocol (SOAP).

In the following description, many of the described embodiments involve mobile devices communicating with a proxy server over a wireless network. The present application may be particularly advantageous in a wireless networking situation due to the cost and bandwidth limitations of a wireless network. Nevertheless, the present application is not necessarily limited to mobile devices and wireless communications and may be applicable more broadly to any communications device configured to send protocol requests to a remote system routed via a proxy server.

Reference is made to FIG. 1, which shows, in block diagram form, an example communication system 100. The communication system 100 includes a number of mobile communication devices ("mobile devices") 201, which may be connected to the remainder of system 100 in any of several different ways. For illustrative purposes, two instances of mobile devices 201 are depicted in FIG. 1 each employing different example ways of connecting to system 100. Mobile devices 201 are connected to a wireless communication network 101, which may comprise one or more of a Wireless Wide Area Network (WWAN) 102, a Wireless Local Area Network (WLAN) 104, or any other suitable network arrangements. In some embodiments, the mobile devices 201 are configured to communicate over both the WWAN 102 and WLAN 104, and to roam between these networks. In some embodiments, the wireless network 101 may comprise multiple WWANs 102 and WLANs 104.

The WWAN 102 may be implemented as any suitable wireless access network technology. By way of example, but not limitation, the WWAN 102 may be implemented as a wireless network that includes a number of base stations 108 (one of which is shown in FIG. 1), each containing radio transmitting and receiving equipment adapted to provide wireless radio-frequency (RF) network service or "coverage" to a corresponding area or cell. The WWAN 102 is typically operated by a mobile network service provider that provides subscription packages to users of the mobile devices 201. The WWAN 102 may be implemented as any appropriate wireless network, including, but not limited to, any to one or more of the following wireless network types: Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network), EvDO (Evolution-Data Optimized) CDMA2000, EDGE (Enhanced Data rates for GSM Evolution), UMTS (Universal Mobile Telecommunication Systems), HSPDA (High-Speed Downlink Packet Access), IEEE 802.16e (also referred to as Worldwide Interoperability for Microwave Access or "WiMAX"). Other network types and technologies could also be used. Although WWAN 102 is described as a "Wide-Area" network, that term is intended herein also to incorporate wireless Metropolitan Area Networks (WMAN) and other similar technologies for providing coordinated service wirelessly over an area larger than that covered by typical WLANs.

A wireless network gateway 110 may be associated with the WWAN 102 to connect the mobile devices 201 to transport facilities 112, and through the transport facilities 112 to a wireless connector system 120. Transport facilities may include one or more private networks or lines, the public internet, a virtual private network, or any other suitable network. The wireless connector system 120 may be operated, for example, by an organization or enterprise such as a corporation, university, or governmental department, which allows access to a network 124 such as an internal or enterprise network and its resources, or the wireless connector system 120 may be operated by a mobile network provider. In some embodiments, the network 124 may be realized using the Internet rather than an internal or enterprise network.

The wireless network gateway 110 provides an interface between the wireless connector system 120 and the WWAN 102, which facilitates communication between the mobile devices 201 and other devices (not shown) connected, directly or indirectly, to the WWAN 102. Accordingly, communications sent via the mobile devices 201 are transported via the WWAN 102 and the wireless network gateway 110 through transport facilities 112 to the wireless connector system 120. Communications sent from the wireless connector system 120 are received by the wireless network gateway 110 and transported via the WWAN 102 to the mobile devices 201.

The WLAN 104 comprises a wireless network which, in some embodiments, conforms to IEEE 802.11x standards (sometimes referred to as Wi-Fi) such as, for example, any or all of the IEEE 802.11a, 802.11b, 802.11g, or 802.11n standards. Other communication protocols may be used for the WLAN 104 in other embodiments such as, for example, IEEE 802.16e (also referred to as Worldwide Interoperability for Microwave Access or "WIMAX"), or IEEE 802.20 (also referred to as Mobile Wireless Broadband Access). The WLAN 104 includes one or more wireless RF Access Points (AP) 114 (one of which is shown in FIG. 1) that collectively provide WLAN service or coverage over an area.

The WLAN 104 may be a personal network of the user, an enterprise network, or a hotspot offered by an internet service provider (ISP), a mobile network provider, or a property owner in a public or semi-public area, for example. The access points 114 are connected to an access point (AP) interface 116, which may connect to the wireless connector system 120 directly (for example, if the access point 114 is part of an enterprise WLAN 104 in which the wireless connector system 120 resides), or indirectly (not shown) via the transport facilities 112 if the access point 14 is a personal Wi-Fi network or Wi-Fi hotspot (in which case, a mechanism for securely connecting to the wireless connector system 120, such as a virtual private network (VPN), may be desirable). The AP interface 116 provides translation and routing services between the access points 114 and the wireless connector system 120 to facilitate communication, directly or indirectly, with the wireless connector system 120.

The wireless connector system 120 may be implemented as one or more servers, and is typically located behind a firewall 113. The wireless connector system 120 manages communications, including e-mail messages, to and from a set of managed mobile devices 201. The wireless connector system 120 also provides administrative control and management capabilities over users and mobile devices 201 which may connect to the wireless connector system 120.

The wireless connector system 120 allows the mobile communication devices 201 to access the network 124 and connected resources and services such as a messaging server (for example, a Microsoft Exchange™, IBM Lotus Domino™, or Novell GroupWise™ email messaging server) and other application servers 142. In the context of the present disclosure, the term application server 142 encompasses both content servers for providing content such as internet content or content from an organization's internal servers, as well as servers for implementing server-based applications such as instant messaging (IM) applications.

The wireless connector system 120 typically provides a secure exchange of data (e.g., e-mail messages, personal information manager (PIM) data, and IM data) with the mobile devices 201. In some embodiments, communications between the wireless connector system 120 and the mobile devices 201 are encrypted.

An application running on a mobile communication device 201 may be in communication with one of more application servers 142 through one or more proxy servers 132 which may facilitate the provision of resources and services. In accordance with one aspect of the present disclosure, a proxy server 132 caches protocol headers for one or more mobile electronic devices 201. In at least one embodiment, the proxy server 132 is implemented through computer program instructions that reside on a persistent storage on the wireless connector system 120, and which are executed by one or more microprocessors. In some embodiments, the proxy server 132 could be implemented on a separate computer than the wireless connector system 120. In an example embodiment, the proxy server 132 provides HTTP connectivity between the wireless network 101 and devices and/or networks connected directly or indirectly to wireless connector system 120. The system shown in FIG. 1 is but one possible configuration for a communications system on which embodiments of the present disclosure may be implemented. In FIG. 1, the proxy server 132 is illustrated as part of the wireless connector system 120; however, in some embodiments proxy servers may be separate from the wireless connector system 120 and may reside at a different location on the network 124.

In other embodiments, a proxy server 132 may reside at the same location as an application server 142. In yet other embodiments, there may be no proxy server, and the application server 142 itself may cache protocol headers for one or more mobile electronic devices 201.

The wireless network gateway 110 is adapted to send data packets received from the mobile device 201 over the WWAN 102 to the wireless connector system 120. The wireless connector system 120 then sends the data packets to the appropriate connection via a proxy server 132, or directly to an application server 142. Conversely, the wireless connector system 120 sends data packets received, for example, from the proxy server 132 or application server 142 to the wireless network gateway 110 which then transmits the data packets to the destination mobile device 201. The AP interfaces 116 of the WLAN 104 provide similar sending functions between the mobile device 201, the wireless connector system 120 and network connection point such as the proxy server 132 and application server 142.

The network 124 may comprise a private local area network, metropolitan area network, wide area network, the public internet or combinations thereof and may include virtual networks constructed using any of these, alone, or in combination.

It will be appreciated that the above-described communication system 100 is provided for the purpose of illustration only, and that the above-described communication system 100 comprises one possible communication network configuration of a multitude of possible configurations for use with the mobile communication devices 201. The teachings of the present disclosure may be employed in connection with any other type of network and associated devices that are effective in implementing or facilitating wireless communication. Suitable variations of the communication system will be understood to a person of skill in the art and are intended to fall within the scope of the present disclosure.

Figure 2:
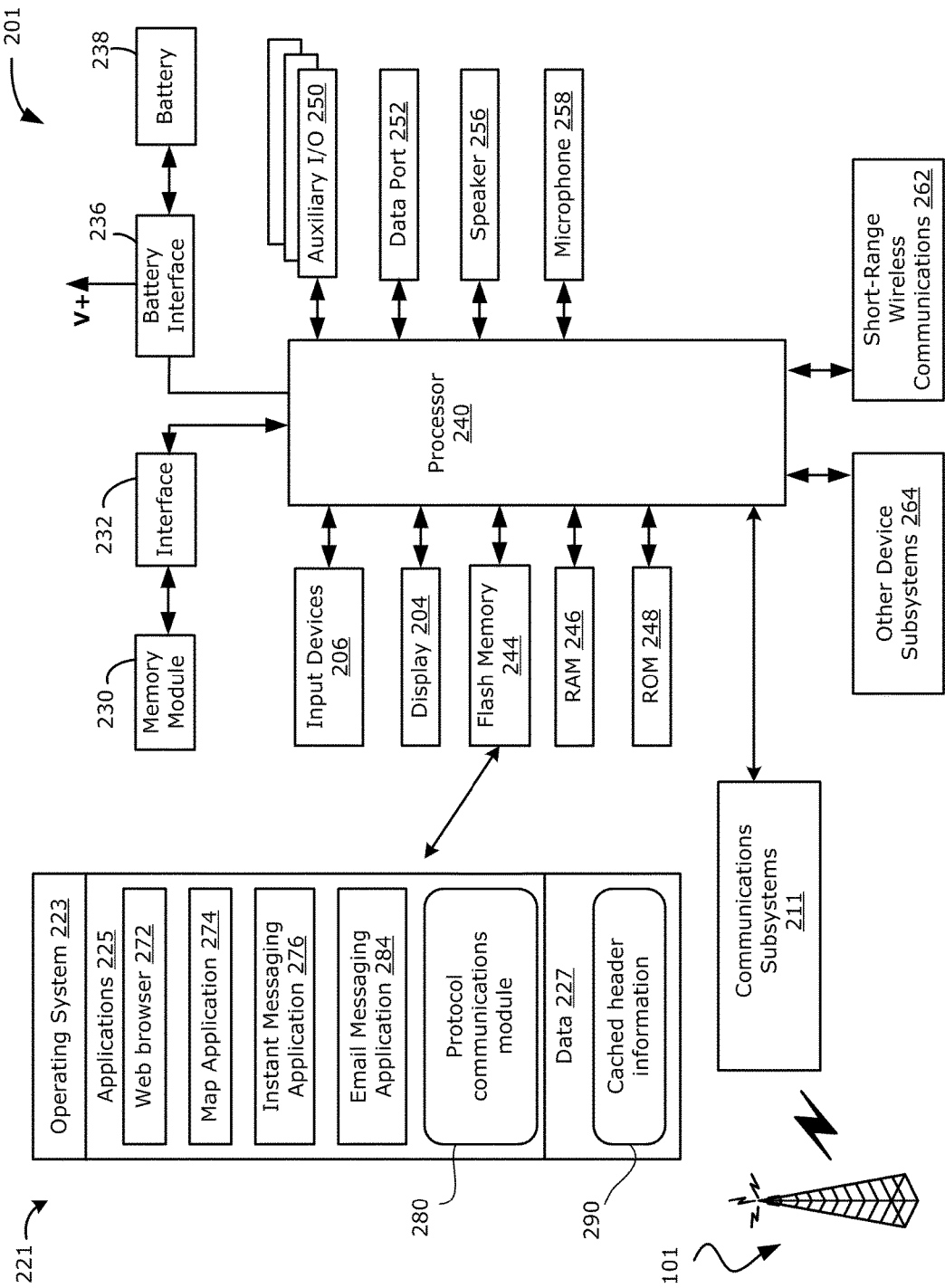
FIG. 2 is a block diagram showing an example of a mobile device that can be used in the communications system of FIG. 1.

Reference is now made to FIG. 2 which illustrates a mobile device 201 in which example embodiments described in the present disclosure can be applied. The mobile device 201 is a two-way communication device having data and voice communication capabilities, and the capability to communicate with other computer systems, for example, via the Internet. Depending on the functionality provided by the mobile device 201, in various embodiments the device 201 may be a multiple-mode communication device configured for both data and voice communication, a smartphone, a mobile telephone or a PDA (personal digital assistant) enabled for wireless communication, or a computer system with a wireless modem.

The mobile device 201 includes a rigid case (not shown) housing the components of the device 201. The internal components of the device 201 are constructed on a printed circuit board (PCB). The mobile device 201 includes a controller comprising at least one processor 240 (such as a microprocessor) which controls the overall operation of the device 201. The processor 240 interacts with device subsystems such as a wireless communication subsystem 211 for exchanging radio frequency signals with the wireless network 101 to perform communication functions. The processor 240 interacts with additional device subsystems including a display screen 204 such as a liquid crystal display (LCD) screen, input devices 206 such as a keyboard and control buttons, flash memory 244, random access memory (RAM) 246, read only memory (ROM) 248, auxiliary input/output (I/O) subsystems 250, data port 252 such as serial data port, such as a Universal Serial Bus (USB) data port, speaker 256, microphone 258, short-range communication subsystem 262, and other device subsystems generally designated as 264. Some of the subsystems shown in FIG. 2 perform communication-related functions, whereas other subsystems may provide "resident" or on-device functions.

The device 201 may comprise a touchscreen display in some embodiments. The touchscreen display may be constructed using a touch-sensitive input surface connected to an electronic controller and which overlays the display screen 204. The touch-sensitive overlay and the electronic controller provide a touch-sensitive input device and the processor 240 interacts with the touch-sensitive overlay via the electronic controller.

The mobile device 201 may communicate with any one of a plurality of fixed transceiver base stations 108 (FIG. 1) of the wireless network 101 within its geographic coverage area. The mobile device 201 may send and receive communication signals over the wireless network 101 after the required network registration or activation procedures have been completed.

The processor 240 operates under stored program control and executes software modules 221 stored in memory such as persistent memory, for example, in the flash memory 244. As illustrated in FIG. 2, the software modules 221 comprise operating system software 223 and software applications 225, which may include a web browser 272, a map application 274, an instant messaging application 276, and an email messaging application 284. In some example embodiments, the functions performed by each of the applications 272, 274, 276 and 284 may each be realized as a plurality of independent elements, and any one or more of these elements may be implemented as parts of other software applications 225. In some example embodiments, one or more applications 225 are configured to send protocol requests to a proxy server 132 (FIG. 1), and to receive protocol responses from the same proxy server 132 (FIG. 1).

For illustration purposes, FIG. 2 shows a protocol communications module 280. In some example embodiments, the protocol communications module 280 may be configured to format and send protocol requests and to receive protocol responses over the communications subsystem 211. In some embodiments, the protocol requests and responses may conform to HTTP or other similar protocols.

The protocol communications module 280 is configured to determine that certain defined headers have been cached by a proxy server and, thereafter, to send further request with a reduced set of headers. In particular, the protocol communications module 280 is configured to send only headers that have not been cached. In yet a further embodiment, the protocol communications module 280 is configured to determine whether the values of any of the cached headers have changed since the most recent request and, if so, then to send a next request with a reduced set of headers that includes any of the cached headers whose values have changed. This enables the proxy server to update the set of cached headers.

In some embodiments, the cached headers could be stored for a single protocol session between the protocol communications module 280 and the proxy server 132. In other embodiments, the cached headers could be persistent and could remain cached on the proxy server 132 over multiple protocol sessions, for a period of time or until a predefined event occurs.

In some embodiments, the proxy server 132 could store and maintain the cached headers based on identification of the connection with the device 201. In some embodiments, this connection identification could be based on an internet protocol address and port number. In other embodiments, the proxy server 132 could store and maintain cached headers based on a unique device identifier.

Although the protocol communications module 280 is shown as an individual module or application those of ordinarily skill in the art will appreciated that in many embodiments the functions of the protocol communications module 280 described above and detailed further below may be implemented within individual applications, such as the web browser 272 or within the operating system 223 and not necessarily using a separate module or application. The present application contemplates all such implementations.

Those skilled in the art will appreciate that the software modules 221 or parts thereof may be temporarily loaded into volatile memory such as the RAM 246. The RAM 246 is used for storing runtime data variables and other types of data or information, as will be apparent to those skilled in the art. Although specific functions are described for various types of memory, this is merely one example, and those skilled in the art will appreciate that a different assignment of functions to types of memory could also be used.

In some embodiments, the auxiliary input/output (I/O) subsystems 250 may comprise an external communication link or interface, for example, an Ethernet connection. The mobile device 201 may comprise other wireless communication interfaces for communicating with other types of wireless networks, for example, a wireless network such as an orthogonal frequency division multiplexed (OFDM) network or a GPS (Global Positioning System) subsystem comprising a GPS transceiver for communicating with a GPS satellite network (not shown). The auxiliary I/O subsystems 250 may comprise a pointing or navigational tool (input device) such as a clickable trackball or scroll wheel or thumbwheel, or a vibrator for providing vibratory notifications in response to various events on the device 201 such as receipt of an electronic message or incoming phone call, or for other purposes such as haptic feedback (touch feedback).

In some embodiments, the mobile device 201 also includes a removable memory card 230 (typically comprising flash memory) and a memory card interface 232. Network access typically associated with a subscriber or user of the mobile device 201 via the memory card 230, which may be a Subscriber Identity Module (SIM) card for use in a GSM network or other type of memory card for use in the relevant wireless network type. The memory card 230 is inserted in or connected to the memory card interface 232 of the mobile device 201 in order to operate in conjunction with the wireless network 101.

The mobile device 201 also stores other data 227 in an erasable persistent memory, which in one example embodiment is the flash memory 244. In various embodiments, the data 227 includes service data comprising information required by the mobile device 201 to establish and maintain communication with the wireless network 101. The data 227 may also include user application data such as email messages, address book and contact information, calendar and schedule information, notepad documents, image files, and other commonly stored user information stored on the mobile device 201 by its user, and other data. The data 227 stored in the persistent memory (e.g. flash memory 244) of the mobile device 201 may be organized, at least partially, into a number of databases each containing data items of the same data type or associated with the same application. For example, email messages, contact records, and task items may be stored in individual databases within the device memory.

The data 227 stored in memory (volatile or non-volatile) may include cached header information 290. The cached header information 290 identifies the defined headers that have been cached by the proxy server. In some embodiments, the cached header information 290 may be a list of the defined headers cached by the proxy server. In other embodiments, the headers may be indicated using indices, pointers or other indirect mechanisms for specifying which headers have been cached. In yet further embodiments, the cached header information 290 may specify the cached header fields alone, while in other embodiments the cached header information 290 may specify the fields and the header values. In yet other embodiments, the cached headers may be stored with an associated time stamp. Variations will be apparent to those ordinarily skilled in the art in light of the description herein.

The cached header information 290 may be stored by the protocol communications module 280 based on a response message received from the proxy server. The response message may contain information identifying the headers cached by the proxy server, as will be described further below.

The serial data port 252 may be used for synchronization with a user's host computer system (not shown). The serial data port 252 enables a user to set preferences through an external device or software application and extends the capabilities of the mobile device 201 by providing for information or software downloads to the mobile device 201 other than through the wireless network 101. The alternate download path may, for example, be used to load an encryption key onto the mobile device 201 through a direct, reliable and trusted connection to thereby provide secure device communication.

In some embodiments, the mobile device 201 is provided with a service routing application programming interface (API) which provides an application with the ability to route traffic through a serial data (i.e., USB) or Bluetooth® (Bluetooth® is a registered trademark of Bluetooth SIG, Inc.) connection to the host computer system using standard connectivity protocols. When a user connects their mobile device 201 to the host computer system via a USB cable or Bluetooth® connection, traffic that was destined for the wireless network 101 is automatically routed to the mobile device 201 using the USB cable or Bluetooth® connection. Similarly, any traffic destined for the wireless network 101 is automatically sent over the USB cable Bluetooth® connection to the host computer system for processing.

The mobile device 201 also includes a battery 238 as a power source, which is typically one or more rechargeable batteries that may be charged, for example, through charging circuitry coupled to a battery interface such as the serial data port 252. The battery 238 provides electrical power to at least some of the electrical circuitry in the mobile device 201, and the battery interface 236 provides a mechanical and electrical connection for the battery 238. The battery interface 236 is coupled to a regulator (not shown) which provides power V+ to the circuitry of the mobile device 201.

The short-range communication subsystem 262 is an additional optional component which provides for communication between the mobile device 201 and different systems or devices, which need not necessarily be similar devices. For example, the subsystem 262 may include an infrared device and associated circuits and components, or a wireless bus protocol compliant communication mechanism such as a Bluetooth® communication module to provide for communication with similarly-enabled systems and devices.

A predetermined set of applications that control basic device operations, including data and possibly voice communication applications will normally be installed on the mobile device 201 during or after manufacture. Additional applications and/or upgrades to the operating system 223 or software applications 225 may also be loaded onto the mobile device 201 through the wireless network 101, the auxiliary I/O subsystem 250, the serial port 252, the short-range communication subsystem 262, or other suitable subsystem 264. The downloaded programs or code modules may be permanently installed, for example, written into the program memory (i.e. the flash memory 244), or written into and executed from the RAM 246 for execution by the processor 240 at runtime. Such flexibility in application installation increases the functionality of the mobile device 201 and may provide enhanced on-device functions, communication-related functions, or both. For example, secure communication applications may enable electronic commerce functions and other such financial transactions to be performed using the mobile device 201.

The mobile device 201 may provide two principal modes of communication: a data communication mode and an optional voice communication mode. In the data communication mode, a received data signal such as a text message, an email message, or Web page download will be processed by the communication subsystem 211 and input to the processor 240 for further processing. For example, a downloaded Web page may be further processed by a browser application or an email message may be processed by the email messaging application and output to the display 204. A user of the mobile device 201 may also compose data items, such as email messages, for example, using the input devices in conjunction with the display screen 204. These composed items may be transmitted through the communication subsystem 211 over the wireless network 101.

In the voice communication mode, the mobile device 201 provides telephony functions and operates as a typical cellular phone. The overall operation is similar, except that the received signals would be output to the speaker 256 and signals for transmission would be generated by a transducer such as the microphone 258. The telephony functions are provided by a combination of software/firmware (i.e., the voice communication module) and hardware (i.e., the microphone 258, the speaker 256 and input devices). Alternative voice or audio I/O subsystems, such as a voice message recording subsystem, may also be implemented on the mobile device 201. Although voice or audio signal output is typically accomplished primarily through the speaker 256, the display screen 204 may also be used to provide an indication of the identity of a calling party, duration of a voice call, or other voice call related information.

Figure 4:
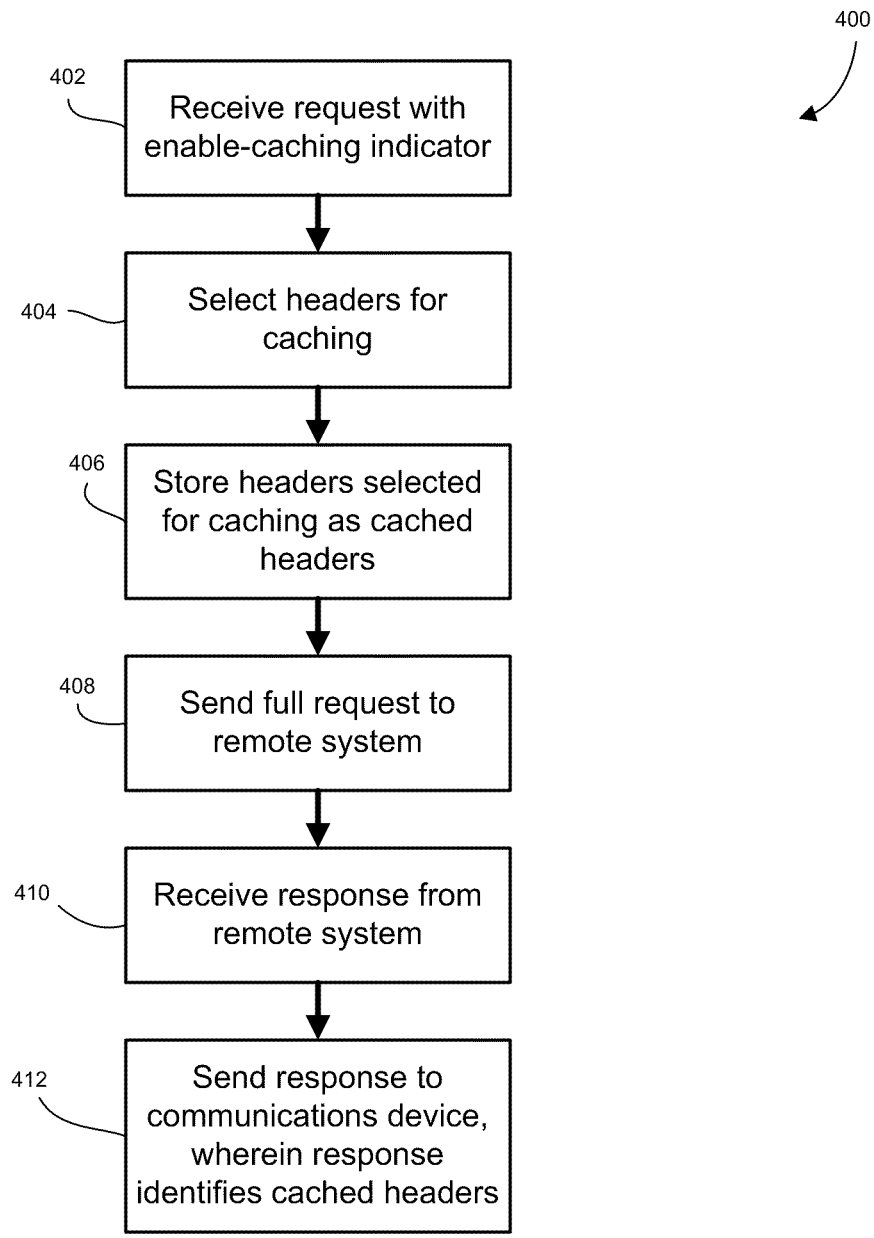
FIG. 4 shows, in flowchart form, an example method of reducing data transmitted between a communications device and a proxy server.

Reference is now made to FIG. 4, which shows, in flowchart form, a method 400 of reducing data transmitted in communications between a communications device and a proxy server. In some embodiments, the communications device may include a mobile device communicating with the proxy server over a wireless network.

The method 400 begins with receipt of a protocol request in step 402. The protocol request is received at the proxy server from the communications device. The protocol request is directed to a remote system, which may in some embodiments include a web server, applications server, or media content server. Other types of remote systems may be included in other embodiments. The protocol request includes a number of defined headers, wherein the defined headers are fields containing information or values set by the communications device.

The protocol request received at the proxy server includes an enable-caching indicator. The indicator may be a flag, value, or other data that indicates the communication device is configured to recognize header caching in accordance with the present application. The indicator may be placed in a header or in the payload of the request, depending on the implementation.

In step 404, in response to receipt of the request containing the enable-caching indicator, the proxy server selects which of the defined headers to cache. In some instances, the proxy server caches all headers. In yet other embodiments, the proxy server determines which of the headers are static headers unlikely to change during a communication session. The determination may be based on predefined list of headers that are considered relatively static or "cacheable". In another embodiment, the determination may be based on an indication from the communications device as to which headers should be cached. The communications device, or more specifically the protocol communications module 280 (FIG. 2), may identify which headers are deemed static based on settings within the device and/or a stored history of header values or time since last change in value. The headers that are considered static or cacheable may be specified in the request message. The request message may, for example, contain a list of the headers considered cacheable or may contain pointers or indices that specify the cacheable headers. Other mechanisms for indicating which headers are cacheable may also be used. Those skilled in the art will appreciated that in other embodiments, the communications device may specify which headers are not cacheable instead of which headers are cacheable. In such an embodiment, the proxy server is configured to determine, in step 404, that all the received defined headers are cacheable except those that the request message specifies are not cacheable.

In step 406, the headers determined in step 404 to be static/cacheable, are then stored in memory on the proxy server.

The unchanged request message is then forwarded by the proxy server to the remote system in step 408, and a response message from the remote system is received by the proxy server in step 410.

The proxy server forwards the response message to the communications device in step 412, but adds information to the response message identifying the cached headers. As noted above, the information added to the response message identifying the cached headers may, in one embodiment, be a list of the cached headers. In some embodiments, the information may indirectly indicate the cached headers. For example, the information may list the uncached headers. Or, in another example, the information may include indices or other indirect mechanism for specifying the cached headers. The information may be appended to the payload or inserted in a header field of the response message.

Once it receives the response message, the communications device will be aware of which headers have been cached at the proxy server. It may store this as cached header information 290 (FIG. 2) in memory. Thereafter, subsequent application protocol level requests sent to the proxy server may be generated and formatted by the communications device to exclude the cached headers, thereby reducing the overhead transmitted in subsequent requested. These may be referred to herein as "abridged" requests. At the proxy server, the cached headers are added to the "abridged" requests to create "unabridged" requests for transmission to the addressee, i.e. the remote system.

Figure 3:
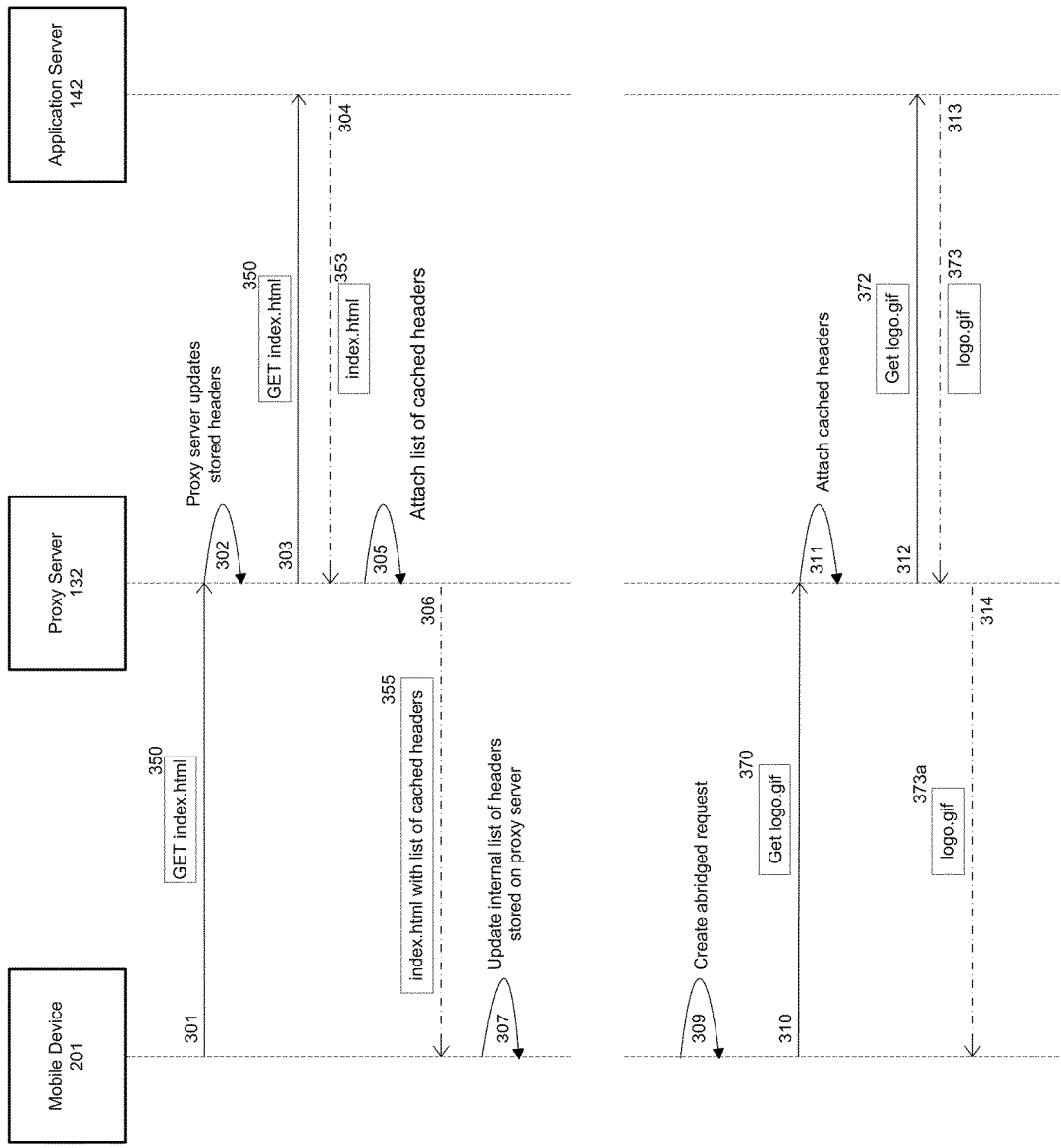
FIG. 3a is a flowchart of a communication between a mobile device, a proxy server and an application server.
FIG. 3b is a flowchart of another communication between a mobile device, a proxy server and an application server.

FIG. 3a shows an example signalling diagram illustrating communications between a mobile device 201 and an application server 142 in accordance with one aspect of the present disclosure. In this example, the mobile device 201 is running a web browser 272 application. The user of the mobile device has triggered the web browser 272 to request "index.html" from an application server 142 at a remote location.

In step 301, the device 201 sends a protocol request 350 over a wireless network to proxy server 132. This request can be in the form of any communication message such as an HTTP message. The structure of a communication message is dependent on the specific application and protocol being used. Generally, these protocol messages include an instruction line or message type, a number of header fields and values for setting various parameters or communication settings, and a message body containing data or instructions.

In one embodiment, the protocol request 350 sent in step 301 includes one or more defined headers, as well as an enable-caching header. In this example, the defined headers could contain information regarding the type of browser being used, or the character set which would be acceptable for the response. A defined header refers to any header whose syntax and parameters have been standardized such that it can be recognized and used by any two devices utilizing the same protocol. A person skilled in the art would recognize that these defined headers could be publicly defined (as they are for HTTP) or they could be proprietary headers which may only be recognized by specific client and server implementations.

Once the protocol request 350 is received by the proxy server 132, the enable-caching header would act as a notification for the proxy server 132 to enable the caching headers feature for this connection. In step 302, the proxy server 132 stores a copy of at least one but not necessarily all of the defined headers which contain potentially redundant information, and in step 303 forwards the protocol request 350 over the network 124 to the application server 142. In some embodiments, the enable-caching header may specify which defined headers should be cached on the proxy server 132.

In step 304, the application server 142 receives the request 350 and sends a response containing the requested "index.html" back to the proxy server 132.

In step 305, the proxy server 132 creates a notification to inform the mobile device 201 which defined headers have been stored or updated on the proxy server 132. This notification is embedded in the response 353 in the form of a cached-header header in some embodiments. To minimize the information being sent over the wireless network, in one example embodiment, the cached-header header could list only the field names of the headers stored on the proxy server 132. However, in certain embodiments it may be desirable for the cached-header header to list both the field names and values of the headers stored on the proxy server 132. As described above, other mechanisms may also be used within the response 353 for specifying which headers have been cached, including an indexing scheme.

The protocol response containing the cached-header header 355 is sent from the proxy server 132 to the mobile device in step 306. Upon receipt, application on the mobile device 201 creates an internal list of headers stored on the proxy server 132 based on the information in the cached-header header (step 307). The internal list is stored in memory on the mobile device 201 as cached header information. As noted above, in some embodiments, the cached header information is a list of header fields and/or values, however the cached header information is not necessarily stored in list form.

Advantageously, the cached header information enables the mobile device 201 to reduce the number of headers sent in subsequent request messages. As described below, the mobile device 201 uses the cached header information to determine which un-cached headers need to be included in an "abridged" request message.

FIG. 3b shows a communication between a mobile device 201 and an application server 142 in accordance with another aspect of the present disclosure. In this example, steps 301 to 307 have already been completed, and the web browser 272 application requires "logo.gif" from the application server 142.

In step 309, the application on the mobile device 201 creates an abridged protocol request 370 omitting the defined headers stored in the mobile device's internal list, i.e. including only those headers not included in the cached header information. In step 310, the mobile device 201 sends the abridged request 370 to the proxy server 132.

In step 311, the proxy server 132 attaches or adds the cached defined headers missing from the abridged protocol request 370 to form an unabridged protocol request 372, which it then sends to the application server 142 in step 312.

Upon receipt of the unabridged request 372, the application server 142 sends (step 313) a protocol response 373 back to the proxy server 132, which the proxy server 132 forwards (step 314) on to the mobile device 201.

In one embodiment of the present disclosure, the proxy server and mobile device may be configured to dynamically update one or more of the cached headers. If the mobile device determines that a value of a cached header has changed, for example, due to a new setting within the mobile device, then the mobile device is configured to send the updated value to the proxy server in the next protocol request message. In another example, the mobile device may determine that a request message requires a header not previously used in communications between the device and the proxy server. In any such case, the mobile device forms the abridged protocol request as described previously, excluding any of the cached headers, but including the updated header (whether it was previously cached or not).

Upon receipt of the abridged request containing a new or changed defined header, the proxy server 132 will update the defined headers stored on the proxy server 132, before attaching (step 311) any cached defined headers missing from the request. In one embodiment of the present disclosure, any new or changed header received from the mobile device 201 will always replace any header stored on the proxy server 132. This may minimize any processing overhead on the proxy server 132. The proxy server 132 may be configured to compare the header in an abridged request to the cached headers to determine whether any of the headers in the abridged request contain updated values. In the case of an updated value, the proxy server 132 overwrites the stored value for that header so as to update the cached headers. The proxy server 132 may then attach or add the cached headers to the abridged request to create the unabridged request as described above.

When a proxy server 132 updates its cached headers, it will append a cached-header header containing the updated list of cached headers to the protocol response 373 from the application server 142. The response with the updated cached-header header 373a is sent back to the mobile device 201, which in turn updates its internal list of cached headers.

In another embodiment of the present disclosure, the application on the mobile device 201 can send a protocol request 350, 370 containing a no-cache header. This no-cache header will comprise a list of defined headers that should not be stored on the proxy server 132. The proxy server 132 will not cache any defined header listed in the no-cache header, and in some embodiments, may remove from the cache a previously stored header that is listed in the no-cache header.

In yet another embodiment of the present disclosure, the application on the mobile device 201 may send a protocol request 350, 370 containing an enable-caching header with its value set to 'false'. This will disable header caching on the proxy server 132.

A mobile device 201 that sends an enable-caching header may still compatible with proxy servers 132 and application servers 142 configured to operate in accordance with the protocol, but which may not recognize or may not be designed to cache headers in accordance with the present description. In this situation, such a legacy proxy server 132 will ignore the enable-caching header and will forward the protocol request 350 on to the application server 142. The application server 142 will send a protocol response 353 back to the proxy server 132, which will forward the response to the mobile device 201 without any additional header fields. Upon receipt of the response that does not indicate which headers were cached, the application on the mobile device 201 will recognize that it is communicating with a legacy proxy server or application server that cannot cache headers, and will send all subsequent requests complete with all headers.

In another embodiment of the present disclosure, the proxy server 132 is located on the same computer or system as the application server 142. In this embodiment, the remote server is running on the same system as the proxy server.

In yet another embodiment of the present disclosure, header caching is done by the application server itself. In this embodiment, the device 201 sends a protocol request to the application server 142 including one or more defined headers and an enable-caching indicator. The application server 142 stores a copy of the at least one but not necessarily all of the defined headers which contain potentially redundant information. The application server 142 creates a notification to inform the device 201 which defined headers have been stored or updated on the application server. This notification is embedded in the response with the requested information.

All example embodiments and variants of proxy server caching are also contemplated when caching headers at the application server.

In another embodiment, the device may cache defined headers received from the proxy or application server. In this embodiment, after receiving a request from the device, the server sends an enable-response-caching indicator embedded within a response. Upon receipt, the device stores one or more of the defined headers from the response. Embedded in a subsequent request, the device sends information to the server identifying the cached response headers. All example embodiments and variants of proxy server caching are also contemplated when caching response headers on the device.

The above-described embodiments of the present application are intended to be examples only. Alterations, modifications and variations may be effected to the particular embodiments by those skilled in the art without departing from the scope of the application, which is defined by the claims appended hereto.

The invention claimed is:

1. A method for reducing data transmitted between a communications device and a server, the communications device being configured to transmit requests for content to the server, wherein the requests conform to a protocol, the method comprising:
   transmitting from the communications device to the server a protocol request for content, the protocol request including a plurality of defined headers and an enable-caching indicator;
   receiving, after the transmitting, a protocol response from the server, the protocol response including a notification that includes a list of identifiers identifying at least one of the plurality of defined headers included in the protocol request that has been stored on the server as at least one cached header; and
   sending, after the receiving, a subsequent protocol request to the server as an abridged request, wherein the abridged request excludes at least one defined header that has been stored on the server as the at least one cached header and the abridged request includes any other defined header of the plurality of defined headers that has not been identified as being stored as a cached header.

2. The method of claim 1, further comprising storing cached header information on the communications device identifying the at least one cached header stored on the server.

3. The method of claim 1, further comprising:
   determining that a value of a defined header corresponding to a previously cached header has changed; and
   creating an abridged protocol request excluding at least another one cached header and including the defined header with the changed value.

4. The method of claim 1, wherein the protocol is Hypertext Transfer Protocol (HTTP) or Wireless Application Protocol (WAP).

5. The method of claim 1, wherein the communications device is a mobile device and wherein the mobile device is connected to the server over at least one wireless network.

6. The method of claim 1, wherein the server is a proxy server or an application server.

7. A communication device configured to reduce data transmitted between the communications device and a server, the communication device comprising:
   a processor;
   a memory;
   a communication subsystem for sending and receiving communications with the server; and
   the processor being configured to execute instructions which, when executed by the processor, causes the communication device to send requests for content to the server, wherein the requests conform to a protocol, and further causes the communication device to:
   transmit to the server a protocol request for content, the protocol request including a plurality of defined headers and an enable-caching indicator;
   receive, after transmission of the protocol request, a protocol response from the server, the protocol response including a notification that includes a list of identifiers identifying at least one of the plurality of defined headers included in the protocol request that has been stored on the server as at least one cached header; and
   send, after receipt of the protocol response, a subsequent protocol request to the server as an abridged request, wherein the abridged request excludes at least one defined header that has been stored on the server as the at least one cached header and the abridged request includes any other defined header of the plurality of defined headers that has not been identified as being stored as a cached header.

* * * * *